March 4, 1947.  A. E. WITHERELL  2,417,031
TRACTOR BOOM
Filed May 31, 1945  2 Sheets-Sheet 1
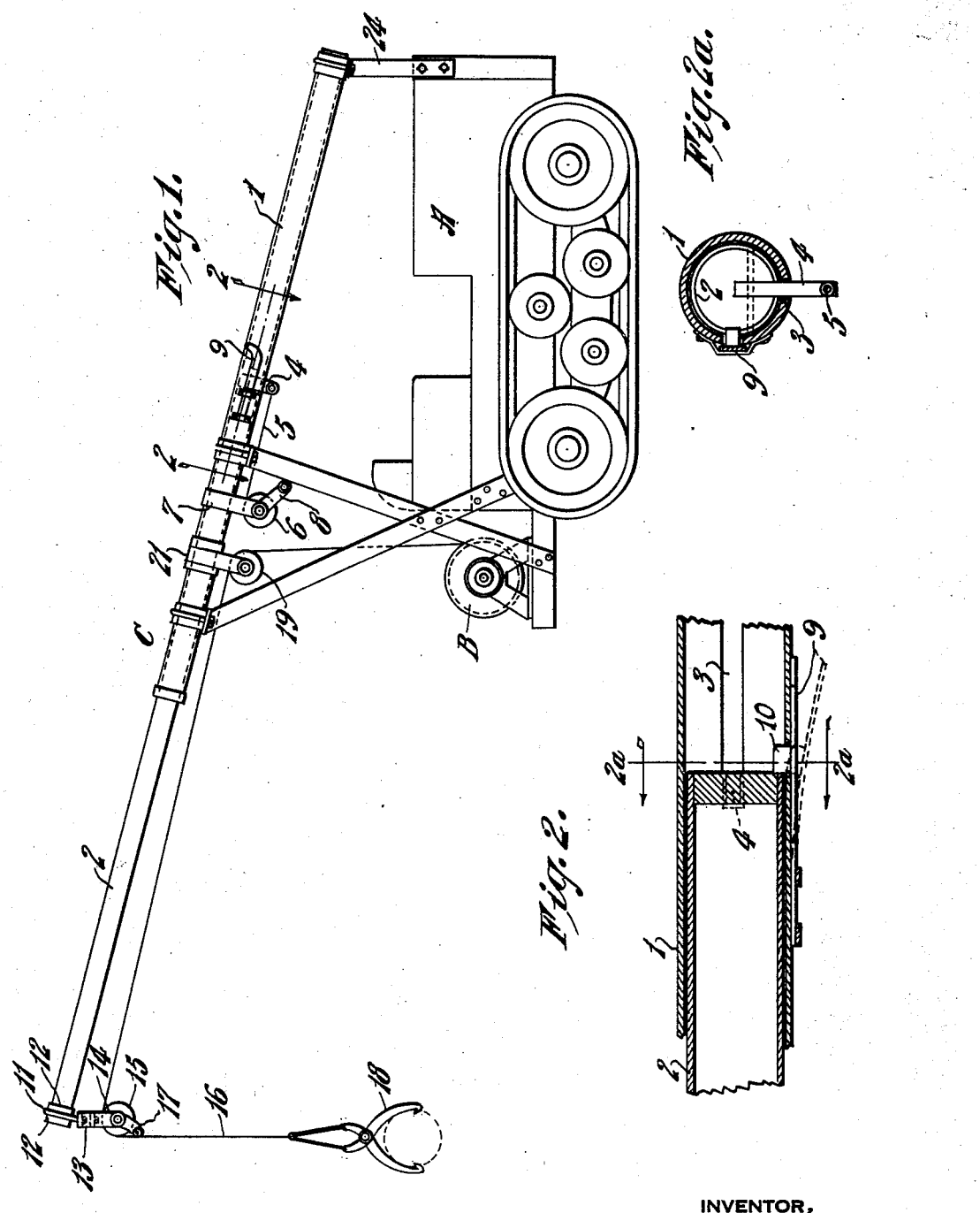
INVENTOR,
Arthur E. Witherell,
BY Chapin & Neal
ATTORNEYS March 4, 1947.  A. E. WITHERELL  2,417,031
TRACTOR BOOM
Filed May 31, 1945  2 Sheets-Sheet 2

INVENTOR,
Arthur E. Witherell,
BY Chapin & Neal
ATTORNEYS

Patented Mar. 4, 1947

2,417,031

UNITED STATES PATENT OFFICE 2,417,031

TRACTOR BOOM

Arthur E. Witherell, Westhampton, Mass.

Application May 31, 1945, Serial No. 596,926

1 Claim. (Cl. 212—141)

This invention relates to a power device, to be mounted on and combined with a tractor, to use as a boom, for loading trailers or trucks. The structure is particularly useful in the woods to handle logs and is designed primarily for that purpose. Of course it is useful for analogous purposes as around the saw mill, farm, and in country work generally.

In conceiving the structure a main idea was to get one which is feasible for use without a heavy investment. Short tractors with caterpillar treads are used in the woods and around the farms for hauling. They commonly carry a power winch, sometimes located in the front and sometimes in the rear of the tractor. Such short tractors, as is well known, are adapted to turn completely around within a circle having a diameter of substantially the same length as the tractor length. According to my invention, I provide a boom construction adapted to be combined for working with this kind of a tractor. The turning of the tractor serves the boom as a turntable, and no separate turntable is needed, to line up the boom for its work. The boom is made of telescoping parts and mounted for the tractor to cruise the woods about as easily as can be done without a boom on the tractor. The boom construction is made in a way to keep its cost so low that it may be added as an accessory to one owning a common woods tractor. The owner is benefited by having a power device for his work with a very big difference between his small investment and that required for any other available motor vehicle and boom combination known to me.

My improved power device is adapted to use under the stated circumstances. An example of the invention in the form for actual use is disclosed by the accompanying drawings and description.

Fig. 1 shows a tractor combined with a boom mounted on it;

Fig. 2 shows a section on line 2—2 of Fig. 1;

Fig. 2A is a section on line 2a—2a of Fig. 2;

The motor tractor A is sold apart from the boom. It is a tractor of comparatively short length, with a power driven endless track, one on each side. It is one of the small kind adapted to use in the logging woods to haul logs for piling them or to haul loaded sleds or trailers out of the woods. A feature of such a tractor is its ability to cruise around in the woods and particularly to turn completely around even better than a two wheel horse-drawn wagon, as no room is needed for the horse.

Figure 3:
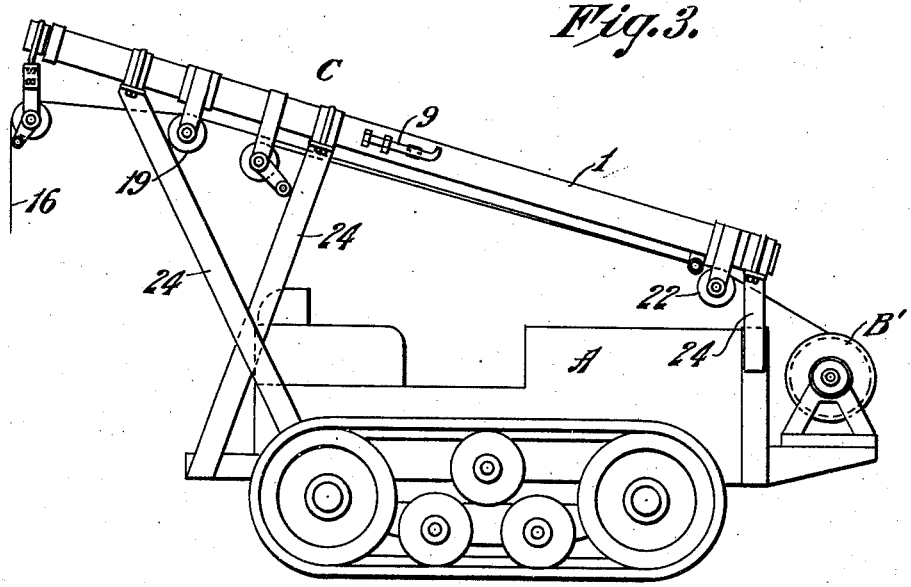
Fig. 3 is a view to show a modification of the arrangement in Fig. 1, to indicate the arrangement of placing the winch on the front of the tractor.

It is customary to have a power driven winch B on such a tractor and driven through a clutch from the tractor power plant. Sometimes it is at the rear as in Fig. 1 and sometimes in the front as in Fig. 3. Such an arrangement of tractor and a winch operated by the tractor engine is so well known that any one concerned will recognize the indications of it without any showing of the detailed means of operation from the tractor engine.

The boom, generally designated C, includes a rigid pipe length 1 and another pipe length 2 of enough smaller diameter to telescope within pipe 1. A longitudinal slot 3 is cut on the underside of pipe 1 of a length about equal to the distance by which pipe 2 may be projected into pipe 1 in the telescoping action. Through this slot projects a bar 4 secured to the inner end of pipe 2. One end of a small cable 5 is fastened to the bar 4. The other end is wound on a drum 6, mounted on a strap support 7 fastened to pipe 1. Crank 8 is turned by hand to wind cable 5 to project pipe 2 for getting the extreme length of the boom. A spring pressed latch 9 mounted outside pipe 1, see Fig. 2, is adapted to engage the back end of the pipe 2 to hold it in projected position. This latch can be disengaged by springing the latch outwardly to remove lug 10 to dotted line position of Fig. 2. At the outer end of pipe 2 a loose band 11, one free to move circumferentially, is mounted. Rings 12, one on each side, are fastened securely to pipe 2 and retain band 11 in place longitudinally of the pipe. Band 11 supports a swivel 13, which supports yoke 14, in which sheave 15 is mounted to rotate freely on a horizontal axis. The swivel mounting for the yoke 14 permits it to turn freely on a vertical axis. Thus the sheave 15 may turn to any line of pull exerted on large cable 16 passing over the sheave. This action of lining up the sheave is aided by guides 17 one extending from each side of the sheave support and beyond its circumference as indicated.

The cable 16 is shown with well known automatic gripping tongs 18 to fasten on a log, the latter shown dotted in Fig. 1. After passing over sheave 15, the cable passes over sheave 19 and down to the power winch B of tractor A, Fig. 1. The hanger support 21 is mounted on pipe 1 about vertically of the winch. When the winch B' is mounted in front of the tractor, see Fig. 3, cable 16 extends to a sheave 22 mounted near the end of pipe 1 and down to the power winch B'. These sheaves are mounted on the pipe by strap supports and side rings similar to that described for the outer end swivel.

The boom is supported by angle iron members 24 bolted to the tractor frame and by U bolts fastened to pipe 1, with side rings to help hold the U bolts in place in the fashion as those described for the strap supports for hanging the sheaves. This manner of supporting the boom is clear from the drawing without description of all its detail. As seen, the boom has considerable angular elevation on its mounting, appearing somewhat like a long range cannon. It is carried substantially in the plane passing vertically through the tractor lengthwise, see Fig. 4. The skeleton support furnished by members 24 is built up in arched form with side members connected at the tractor sides and the top cross members carrying pipe 1 at the middle portions. The arched form per se, is not shown in the drawings. It will be understood from the legs of the form, seen from one side, in Figs. 1 and 3, the legs on the opposite side being the same, mere duplicates of those seen, with top cross members, the top carrying the pipe 1 as stated. The arrangement is for one pair of legs 24, Fig. 3, to stand astride the tractor at its front end and longer ones to stand astride the tractor at its rear end, supporting the main boom section in the form of pipe 1 in the position indicated by Figs. 3 and 4 with relation to the tractor. This leaves the tractor body free of access, and the driver has plenty of head room and all around view from his seat.

The winch used has a customary power take-off connection from the tractor engine, with the usual operating controls, not shown. Thus the winch may wind large cable 16 or permit it to be pulled out with or without brake control. The detail of the winch operating parts will not be described in detail. Its function as a power winch will be understood.

The operation and use of the device will now be referred to by way of a few examples. Assume that pipe section 1 is telescoped in section 2. The tractor-boom device can cruise the woods as easily, in ways easier than the tractor can cruise without the boom. The slanting forward end will push aside branches which might otherwise sweep across the driver's position.

Assume that the work is to fully load a sled with logs, lying here and there in the woods. The sled is hauled to a place from which the logs can be reached by the cable. The tractor-boom is positioned with the sled S at the rear, see Fig. 4. In such position the driver winds up cable 5 to extend the boom. The worker takes tongs 18 to a log. He has a large area from sheave 15 as an overhead center where he can apply the tongs to any log in the area of the circle indicated by 25 in Fig. 4 for example. He applies the tongs to one after another and the driver at the tractor controls cable 16 drawing it in by power, letting it out under braking action, or freely according to cooperating steps needed by the ground worker. The latter guides the log suspended by the cable to the sled S. The latter is preferably under the end sheave 15 but there is considerable leeway so long as the log can be drawn to and cross-wise of the sled. The worker can guide it into position for depositing it on the sled S in good loaded position.

Figure 4:
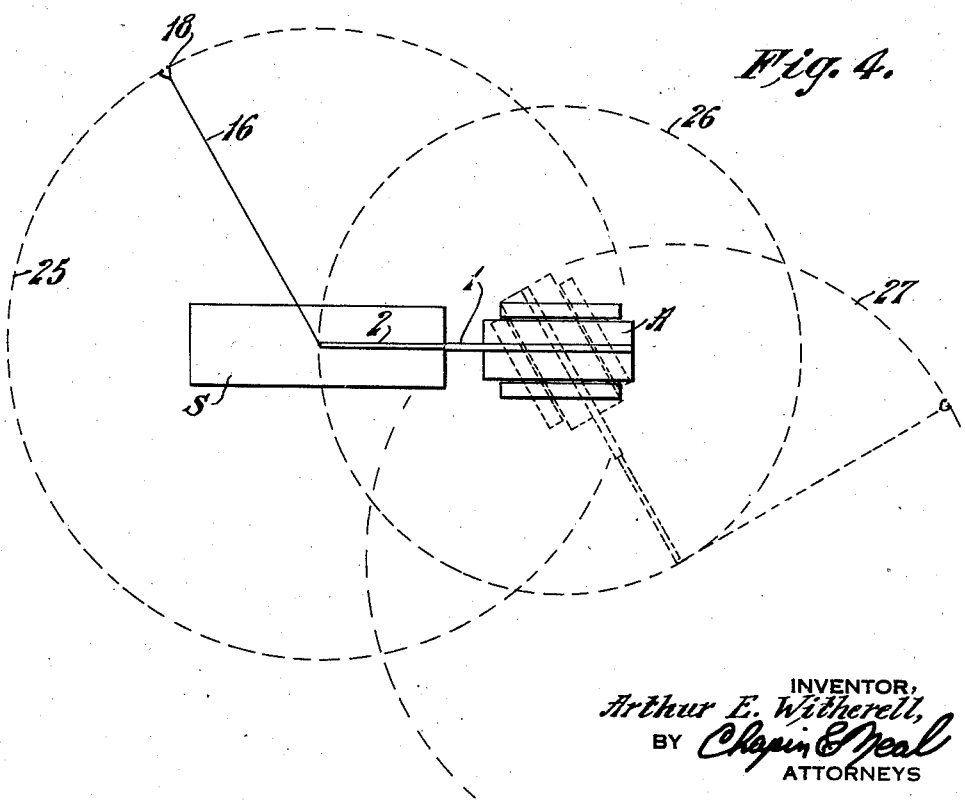
Fig. 4 is a diagrammatic view indicating the scope of operations and the utility of the invention.

In addition, as will be seen from the diagram of Fig. 4, by turning the tractor around on its tracks, sheave 15 can be moved to any point on circle 26. From any such point the ground worker can walk the tongs 18 over the area of a new circle, the circle of 27, for example. Thus with the sled S in one position, see Fig. 4, the ground worker can hook onto any log within the area of any one of a large number of overlapping circles. A large area is within reach for power loading without moving the sled. This fact is of course due to getting the result of a turn-table action in moving the extended boom. One advantage of the structure is to get the full function of a turntable support for the boom without any turntable to be supported on the tractor. As a consequence if enough logs for a full sled load are not quite within reach in one position of my tractor-boom, they can be reached one by one by shifting the tractor angle to do the work over a larger area, without moving the sled, and merely turning the tractor within a circle of about its own length. This is of substantial advantage for working the device in the woods where a central working point is important.

As I mentioned before, my invention is primarily for the benefit of the small operator who cannot well afford the elaborate and expensive and very heavy type of logging equipment. In some respects, however, my equipment is much better able to do the work than the more expensive equipment. For example, it can go places with less preparation. It can get around in places where the other equipment will have trouble. Its primary advantage is in its economy all things considered. It is planned so any logging mechanic, with this disclosure can buy a set of low cost parts, available generally as millwright's supplies, and fix up his tractor as a tractor-boom device. The addition is not enough to make such a tractor any less able to do all its usual work as before. With the addition it can do a great deal more.

Having disclosed my invention, I claim:

A machine for loading and hauling trailers, comprising in combination a common tractor of the self laying track type, two legs mounted astride the tractor at its front end, two longer legs mounted astride the tractor at its rear end, a telescopic boom including a main section and an extensible section, the main section supported at its rear end by said front legs and at its front end by said rear legs, to hold the main section wholly above the tractor in its central longitudinal plane and slanting upwardly toward the rear, over the whole length of the tractor, said extensible section being supported wholly by the main section of the boom, means to move the extensible section out of the main section far enough to the rear for it to overlie a trailer in hitching and hauling relation to the tractor, a sheave pivoted for universal movement on the end of said extensible section, a winch mounted as an accessory of and at one end of the tractor, adapted to draw in and let out a cable extending from the winch up to a guide on the main boom section along the line of both boom sections to said end sheave to draw in a cable load from any angle, position it above a trailer in the aforesaid position back of the tractor and deposit the load by lowering it to said trailer.

ARTHUR E. WITHERELL.

REFERENCES CITED

The following references are of record in the file of this patent:

UNITED STATES PATENTS

| Number | Name | Date |
|---|---|---|
| 517,867 | Killpack | Apr. 10, 1894 |
| 677,874 | McBeth | July 9, 1901 |
| 1,327,324 | Hecker | Jan. 6, 1920 |
| 1,438,292 | Bevan | Dec. 12, 1922 |
| 1,564,133 | Fraser | Dec. 1, 1925 |
| 1,987,688 | Lamb | Jan. 15, 1935 |
| 2,283,443 | Klein | May 19, 1942 |
| 2,322,697 | Lawler | June 22, 1943 |